(12) United States Patent
Foster

(10) Patent No.: US 9,074,100 B2
(45) Date of Patent: Jul. 7, 2015

(54) WOOD FILLER WITH HOT MELT ADHESIVE

(71) Applicant: Van R. Foster, Westerville, OH (US)

(72) Inventor: Van R. Foster, Westerville, OH (US)

(73) Assignee: Elmer's Products, Inc., Westerville, OH (US)

( * ) Notice: Subject to any disclaimer, the term of this patent is extended or adjusted under 35 U.S.C. 154(b) by 0 days.

(21) Appl. No.: 13/869,530

(22) Filed: Apr. 24, 2013

(65) Prior Publication Data

US 2014/0323615 A1    Oct. 30, 2014

Related U.S. Application Data

(60) Provisional application No. 61/637,427, filed on Apr. 24, 2012.

(51) Int. Cl.
*C08L 97/02* (2006.01)
*C08K 3/26* (2006.01)
*C08K 3/34* (2006.01)

(52) U.S. Cl.
CPC . *C08L 97/02* (2013.01); *C08K 3/26* (2013.01); *C08K 3/34* (2013.01)

(58) Field of Classification Search
CPC ............. C08L 97/02; C08K 3/26; C08K 3/34
USPC .................. 524/13, 502; 428/423.1, 523, 521
See application file for complete search history.

(56) References Cited

U.S. PATENT DOCUMENTS 7,504,447 B2 * 3/2009 Foster et al. ..................... 524/13
2007/0042193 A1 * 2/2007 Wang .......................... 428/423.1

* cited by examiner

*Primary Examiner* — Michael M Bernshteyn
(74) *Attorney, Agent, or Firm* — McNees Wallce & Nurick, LLC

(57) ABSTRACT

A wood-filling composition that includes at least one hot melt adhesive, wherein the at least one hot melt adhesive further includes ethylene-vinyl acetate, polyethylene, polypropylene, or combinations thereof; and at least one filler, wherein the at least one filler further includes ceramic microspheres, calcium carbonate, wood flour, or combinations thereof.

8 Claims, No Drawings

WOOD FILLER WITH HOT MELT ADHESIVE

CROSS-REFERENCE TO RELATED APPLICATIONS

This patent application claims the benefit of U.S. Provisional Patent Application Ser. No. 61/637,427 filed on Apr. 24, 2012 and entitled "Wood Filler with Hot Melt Adhesive," the disclosure of which is hereby incorporated by reference herein in its entirety and made part of the present U.S. utility patent application for all purposes.

BACKGROUND OF THE INVENTION

Wood fillers are traditionally used to repair blemishes, holes, and other imperfections in wood items such as furniture and the like. Commercially available wood filling formulations typically utilize waterborne technology or solvent-borne technology and possess many of the properties found in a basically effective product. Although solvent-borne technologies form a surface skin more rapidly than waterborne technologies, the interior part of the product still is heavily filled with either a flammable solvent or water which prevents or restricts the product from complete internal setting/solidification. Upon drying, conventional wood fillers are also subject to volume shrinkage due to the solvent or water that evaporates as the product sets. This effect may reduce the total strength of a repaired area. Hot melt adhesive technology provides rapid "through cure" as the product cools from a molten state to a fixed, room temperature state; however, such materials lack important wood filler properties such as as ease of sandability and stainability. Therefore, there is an ongoing need for an effective wood-filling product that does not suffer from these deficiencies.

SUMMARY OF THE INVENTION

The following provides a summary of certain exemplary embodiments of the present invention. This summary is not an extensive overview and is not intended to identify key or critical aspects or elements of the present invention or to delineate its scope.

In accordance with one aspect of the present invention, a first wood-filling composition is provided. This first composition includes at least one thermoplastic adhesive; and at least one filler. The at least one filler may include ceramic microspheres, calcium carbonate, wood flour, or combinations thereof. Other fillers are possible, In accordance with another aspect of the present invention, a second wood-filling composition is provided. This second composition includes at least one hot melt adhesive, wherein the at least one hot melt adhesive further includes ethylene-vinyl acetate, polyethylene, polypropylene, or combinations thereof; and at least one filler. The at least one filler may include ceramic microspheres, calcium carbonate, wood flour, or combinations thereof. Other fillers are possible.

In yet another aspect of this invention, a third wood-filling composition is provided. This third composition includes at least one hot melt adhesive, wherein the at least one hot melt adhesive further includes ethylene-vinyl acetate, polyethylene, polypropylene, or combinations thereof; and at least one filler, wherein the at least one filler further includes ceramic microspheres, calcium carbonate, wood flour, or combinations thereof.

Additional features and aspects of the present invention will become apparent to those of ordinary skill in the art upon reading and understanding the following detailed description of the exemplary embodiments. As will be appreciated by the skilled artisan, further embodiments of the invention are possible without departing from the scope and spirit of the invention. Accordingly, the drawings and associated descriptions are to be regarded as illustrative and not restrictive in nature.

DESCRIPTION OF THE INVENTION

Exemplary embodiments of the present invention are now described. Although the following detailed description contains many specifics for purposes of illustration, a person of ordinary skill in the art will appreciate that many variations and alterations to the following details are within the scope of the invention. Accordingly, the following embodiments of the invention are set forth without any loss of generality to, and without imposing limitations upon, the claimed invention.

The present invention relates generally to wood fillers and wood-filling compositions and formulations, and more specifically to an effective wood filler that utilizes hot melt adhesive technology. As previously stated, hot melt adhesive technology provides rapid "through cure" as a wood filling product that includes one or more hot melt adhesives cools from a molten state to a fixed, room temperature state. However, such formulations do not provide other desirable end-use characteristics. Exemplary embodiments of this invention include combinations of hot melt adhesives and various fillers and/or extenders that provide commercially acceptable levels of stainability and sandability, as well as other desirable qualities such as improved shelf-life.

Hot melt adhesive (HMA), also known as hot glue, is a form of thermoplastic adhesive. Examples of hot melt adhesive technologies that are compatible with the fillers/extenders of the present invention include ethylene-vinyl acetate (EVA) which is the copolymer of ethylene and vinyl acetate; and the thermoplastic polymers polyethylene and polypropylene. Compatible include ceramic microspheres, wood flour, and/or calcium carbonate (not an exhaustive list). Ceramic microspheres, especially the larger known particle sizes thereof provide enhanced stainability. Ceramic microspheres also improve sandability of the total system because hot melts will typically melt when exposed to the heat generated from the sanding process. Wood flour may be included to improve the stain retention of the wood filler and calcium carbonate is an inexpensive extender. Advantages of the present invention include lack of flammability (unlike solvent-borne wood fillers) and improved shelf life. Because the present invention is a meltable product and is not based on waterborne emulsion technology, there is reduced likelihood of microbial spoilage or damage resulting from the product freezing during transportation.

Having generally described this invention, a further understanding can be obtained by reference to certain specific examples detailed below, which are provided for purposes of illustration only and are not intended to be all inclusive or limiting unless otherwise specified. Typical exemplary formulas of this invention include the following ratios of filler/extender to pre-prepared hot melt adhesive:

EXAMPLE 1

| Raw Material | % (by wt.) | Description/Purpose |
|---|---|---|
| Hot melt adhesive | 52.0 | thermoplastic adhesive |
| Calcium carbonate | 39 | extender |
| Ceramic microspheres | 9 | stainablity/sandability enhancer |
| | 100% | |

EXAMPLE 2

| Raw Material | % (by wt.) | Description/Purpose |
|---|---|---|
| Hot melt adhesive | 52 | thermoplastic adhesive |
| Calcium carbonate | 31 | extender |
| Ceramic microspheres | 17 | stainablity/sandability enhancer |
| | 100% | |

EXAMPLE 3

| Raw Material | % (by wt.) | Description/Purpose |
|---|---|---|
| Hot melt adhesive | 52 | thermoplastic adhesive |
| Wood flour | 5 | stain retention enhancer |
| Calcium carbonate | 17 | extender |
| Ceramic microspheres | 26 | stainablity/sandability enhancer |
| | 100% | |

EXAMPLE 4

| Raw Material | % (by wt.) | Description/Purpose |
|---|---|---|
| Hot melt adhesive | 52.0 | thermoplastic adhesive |
| Wood flour | 5 | stain retention enhancer |
| Ceramic microspheres | 43 | stainablity/sandability enhancer |
| | 100% | |

While the present invention has been illustrated by the description of exemplary embodiments thereof, and while the embodiments have been described in certain detail, it is not the intention of the Applicant to restrict or in any way limit the scope of the appended claims to such detail. Additional advantages and modifications will readily appear to those skilled in the art. Therefore, the invention in its broader aspects is not limited to any of the specific details, representative devices and methods, and/or illustrative examples shown and described. Accordingly, departures may be made from such details without departing from the spirit or scope of the applicant's general inventive concept.

What is claimed:

1. A wood-filling composition, comprising:
   (a) at least one hot melt adhesive, wherein the at least one hot melt adhesive consists of ethylene-vinyl acetate, polyethylene, polypropylene, or combinations thereof; and
   (b) at least one filler.

2. The composition of claim 1, wherein the at least one filler further includes ceramic microspheres, and wherein the ceramic microspheres are operative to enhance the stainability and sand ability of the composition.

3. The composition of claim 1, wherein the at least one filler further includes calcium carbonate, and wherein the calcium carbonate operates as an extender.

4. The composition of claim 1, wherein the at least one filler further includes wood flour and wherein the wood flour is operative to provide enhanced stain retention to the composition.

5. A wood-filling composition, comprising:
   (a) at least one hot melt adhesive, wherein the at least one hot melt adhesive consists of ethylene-vinyl acetate, polyethylene, polypropylene, or combinations thereof; and
   (b) at least one filler, wherein the at least one filler further includes ceramic microspheres, calcium carbonate, wood flour, or combinations thereof.

6. The wood filling composition of claim 5, wherein the ceramic microspheres are operative to enhance the stainability and sandability of the composition.

7. The wood filling composition of claim 5, wherein calcium carbonate operates as an extender.

8. The wood filling composition of claim 5, wherein the wood flour is operative to provide enhanced stain retention to the composition.

* * * * *